(12) United States Patent
Prakash et al.

(10) Patent No.: US 7,813,575 B2
(45) Date of Patent: Oct. 12, 2010

(54) ENHANCING COMPRESSION WHILE TRANSCODING JPEG IMAGES

(75) Inventors: Ravi Prakash, Concord, NC (US); Joan L. Mitchell, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 11/736,665

(22) Filed: Apr. 18, 2007

(65) Prior Publication Data

US 2007/0196026 A1 Aug. 23, 2007

Related U.S. Application Data

(63) Continuation of application No. 10/263,653, filed on Oct. 4, 2002, now Pat. No. 7,260,265.

(51) Int. Cl.
*G06K 9/00* (2006.01)
*G06K 9/36* (2006.01)
*G06K 9/46* (2006.01)

(52) U.S. Cl. .................................. 382/251; 382/239

(58) Field of Classification Search ................. None
See application file for complete search history.

(56) References Cited

U.S. PATENT DOCUMENTS

| | | | |
|---|---|---|---|
| 5,339,368 A | 8/1994 | Higgins-Luthman |
| 5,583,656 A | 12/1996 | Gandhi et al. |
| 5,666,161 A | 9/1997 | Kohiyama et al. |
| 5,699,458 A | 12/1997 | Sprague |
| 5,724,453 A | 3/1998 | Ratnakar et al. |
| 5,774,597 A | 6/1998 | Wilson |
| 5,991,451 A | 11/1999 | Keith et al. |
| 6,031,937 A | 2/2000 | Graffagnino |
| 6,118,820 A | 9/2000 | Reitmeier et al. |
| 6,141,452 A | 10/2000 | Murao |
| 6,167,161 A | 12/2000 | Oami |

(Continued)

FOREIGN PATENT DOCUMENTS

WO  WO 99/57684  11/1999

(Continued)

*Primary Examiner*—Yuzhen Ge
(74) *Attorney, Agent, or Firm*—Whitham, Curtis, Christofferson & Cook, P.C.; Douglas A. Lashmit

OTHER PUBLICATIONS

Copyright 1999 IEEE Low Cost Video Compression using Fast, Modified Z-Coding of Wavelet Pyramids.

(Continued)

(57) ABSTRACT

Further compression of data allowing economical storage of data for extended periods of time in high-speed access memory is performed in reduced time by performing further compression during transcoding in the transform domain and without restoring image data to its original image data form. The reduction in processing time is achieved by exploiting the large number of zero-valued quantization transform coefficients and not changing quantized transform coefficients at zig-zag scan positions where non-zero coefficients are rare during range reduction of the entropy decoded quantized transformed data. The range can be restored by computation or estimation of an altered quantization table which is stored with the further compressed quantization values. Further advantages accrue from use of JPEG packed format for the data during transcoding.

16 Claims, 2 Drawing Sheets

U.S. PATENT DOCUMENTS

| | | | |
|---|---|---|---|
| 6,182,034 | B1 | 1/2001 | Malvar |
| 6,195,465 | B1 | 2/2001 | Zandi et al. |
| 6,195,466 | B1 | 2/2001 | Schwartz et al. |
| 6,343,153 | B1 | 1/2002 | Kawasaki et al. |
| 6,526,099 | B1 | 2/2003 | Christopoulos et al. |
| 6,606,418 | B2 | 8/2003 | Mitchell et al. |
| 6,658,161 | B1 | 12/2003 | Chen et al. |
| 6,941,019 | B1 | 9/2005 | Mitchell et al. |
| 6,950,463 | B2 | 9/2005 | Moni et al. |
| 2003/0044076 | A1 | 3/2003 | Mitchell et al. |

OTHER PUBLICATIONS

Paper from the University of Aahus for Real-Time Software Video Codec based on Wavelets.

PCT International Search Report dated Jun. 30, 2004.

Prakesh et al. XP-002280411 "Enhanced JPEG-Compression of Documents" 2001 IEEE International Conference on Image Processing. Oct. 7, 2001; pp. 494-497.

Ricardo L. de Queiroz XP-00786795 "Processing JPEG-Compressed Images and Documents" IEEE Transactions on Image Processing, vol. 7, No. 12; Dec. 1, 1998.

Syin Chan XP-002280412 "Recompression of Still Images" Internal Report University of Kent, pp. 1-41: Mar. 1992.

Smith et al. XP004419658 "Compressed Domain of JPEG-Encoded Images" Real-Time Imaging, Academic Press Limited ,vol. 2, No. 1; pp. 3-17, Feb. 1996.

"Digital Compression and Coding of Continuous-Tone Still Images Part 1: Requirements and Guidelines Appendix" A XP-00102358; pp. 337-339-369, 371-379, 381-403, 405-475,477-537, 539-543.

ENHANCING COMPRESSION WHILE TRANSCODING JPEG IMAGES

CROSS-REFERENCE TO RELATED APPLICATIONS

This application is a continuation application of U.S. patent application Ser. No. 10/263,653 filed Oct. 4, 2002, now U.S. Pat. No. 7,260,265 and the complete contents thereof is herein incorporated by reference. This application is related to U.S. patent application Ser. No. 09/760,383, entitled "Enhanced Compression of Documents", filed Jan. 16, 2001, now U.S. Pat. No. 6,606,418 B2, Ser. No. 09/736,444, entitled "JPEG Packed Block Structure" filed Dec. 15, 2000, Ser. No. 09/896,110, entitled "JPEG Packed Block Structure for Enhanced Image Processing", filed Jul. 2, 2001, and Ser. No. 10/183,386, filed Jun. 28, 2002, entitled "Adaptive Generation of Q-Table2 for Enhanced Image Quality", all of which are assigned to the assignee of the present invention and hereby fully incorporated by reference.

BACKGROUND OF THE INVENTION

1. Field of the Invention

The present invention generally relates to compression of image data while applying corrections to enhance image quality and, more particularly, to the decoding and re-encoding of documents for additional and more extreme data compression to allow economically acceptable long-term storage in rapid access memory and performing such decoding and re-encoding in reduced processing time.

2. Description of the Prior Art

Pictorial and graphics images contain extremely large amounts of data and, if digitized to allow transmission or processing by digital data processors, often requires many millions of bytes to represent respective pixels of the pictorial or graphics images with good fidelity. The purpose of image compression is to represent images with less data in order to save storage costs or transmission time and costs. The most effective compression is achieved by approximating the original image, rather than reproducing it exactly. The JPEG (Joint Photographic Experts Group) standard, discussed in detail in "JPEG Still Image Data Compression Standard" by Pennebaker and Mitchell, published by Van Nostrand Reinhold, 1993, which is hereby fully incorporated by reference, allows the interchange of images between diverse applications and opens up the capability to provide digital continuous-tone color images in multi-media applications.

JPEG is primarily concerned with images that have two spatial dimensions, contain gray scale or color information, and possess no temporal dependence, as distinguished from the MPEG (Moving Picture Experts Group) standard. JPEG compression can reduce the storage requirements by more than an order of magnitude and improve system response time in the process. A primary goal of the JPEG standard is to provide the maximum image fidelity for a given volume of data and/or available transmission or processing time and any arbitrary degree of data compression is accommodated. It is often the case that data compression by a factor of twenty or more (and reduction of transmission time and storage size by a comparable factor) will not produce artifacts or image degradation which are noticeable to the average viewer.

Of course, other data compression techniques are possible and may produce greater degrees of image compression for certain classes of images or graphics having certain known characteristics. The JPEG standard has been fully generalized to perform substantially equally regardless of image content and to accommodate a wide variety of data compression demands. Therefore, encoders and decoders employing the JPEG standard in one or more of several versions have come into relatively widespread use and allow wide access to images for a wide variety of purposes. Standardization has also allowed reduction of costs, particularly of decoders, to permit high quality image access to be widely available. Therefore, utilization of the JPEG standard is generally preferable to other data compression techniques even though some marginal increase of efficiency might be obtained thereby, especially for particular and well-defined classes of images.

Even though such large reductions in data volume are possible, particularly using techniques in accordance with the JPEG standard, some applications require severe trade-offs between image quality and costs of data storage or transmission time. For example, there may be a need to store an image for a period of time which is a significant fraction of the useful lifetime of the storage medium or device as well as requiring a significant amount of its storage capacity. Therefore, the cost of storing an image for a given period of time can be considered as a fraction of the cost of the storage medium or device and supporting data processor installation, notwithstanding the fact that the image data could potentially be overwritten an arbitrarily large number of times. The cost of such storage is, of course, multiplied by the number of images which must be stored.

Another way to consider the storage cost versus image quality trade-off is to determine the maximum cost in storage that is acceptable and then determine, for a given amount of quality, how long the desired number of images can be saved in the available storage. This is a function of the compressed size of the images which generally relates directly to the complexity of the images and inversely with the desired reconstructed image quality.

An example of such a demanding application is the storage of legal documents which must be stored for an extended period of time, if not archivally, especially negotiable instruments such as personal checks which are generated in large numbers amounting to tens of millions daily. While the initial clearing of personal checks and transfer of funds is currently performed using automated equipment and is facilitated by the use of machine readable indicia printed on the check, errors remain possible and it may be necessary to document a particular transaction for correction of an error long after the transaction of which the check formed a part.

Personal checks, in particular, present some image data compression complexities. For example, to guard against fraudulent transactions, a background pattern of greater or lesser complexity and having a range of image values is invariably provided. Some information will be printed in a highly contrasting ink, possibly of multiple colors, while other security information will be included at relatively low contrast. Decorations including a wide range of image values may be included. Additionally, hand-written or printed indicia (e.g. check amounts and signature) will be provided with image values which are not readily predictable.

Even much simpler documents may include a variety of image values such as color and shadings in letterhead, high contrast print, a watermark on the paper and a plurality of signatures. This range of image values that may be included in a document may limit the degree to which image data may be compressed when accurate image reconstruction is necessary. Therefore that cost of storage in such a form from which image reconstruction is possible with high fidelity to the original document is relatively large and such costs limit the period for which such storage is economically feasible, regardless of the desirability of maintaining such storage and the possibility of rapid electronic access for longer periods.

Since such image values must be accurately reproducible and utilization of the JPEG standard is desirable in order to accommodate widespread access and system intercompatibility, substantially the only technique for further reduction of data volume consistent with reproduction with good image fidelity is to reduce the spatial frequency of sampling of the original image. However, sampling inevitably reduces legibility of small indicia, especially at low contrast. Currently, sampling at 100 dots per inch (dpi) or pixels per inch (about a reduction of one-third to one-sixth from the 300 dpi or 600 dpi resolutions of printers currently in common use) is considered to be the limit for adequate legibility of low-contrast indicia on personal checks. The American National Standards Institute (ANSI) standards committee for image interchange recommends 100 dpi as a minimum resolution. Most check applications use either 100 dpi or 120 dpi grayscale images when they are compressed with more than one bit per pixel.

As a practical matter, the needed quality of the image data also changes over time in such an application. For example, within a few months of the date of the document or its processing, questions of authenticity often arise, requiring image quality sufficient to, for example, authenticate a signature, while at a much later date, it may only be necessary for the image quality to be sufficient to confirm basic information about the content of the document. Therefore, the image data may be additionally compressed for longer term storage when reduced image quality becomes more tolerable, particularly in comparison with the costs of storage. At the present time, personal check images are immediately stored for business use on DASD for about 90 days and transferred to tape for archival purposes and saved, for legal reasons, for seven years. Thus, data is available for only a few months in "on-line", rapid-access storage and some significant processing time is required for transfer to tape.

In this regard, the number of personal checks and other documents produced on a daily basis, itself, presents several problems. The processing required for encoding and/or decoding an image is substantial and may require significant amounts of time even when performed at extremely high speed on general purpose or special purpose processors. Even when an encoding or decoding process may be performed in a fraction of a second (e.g. $\frac{1}{10}$ second or less), the sheer number of documents may occupy the entire processing capacity of a large number of processors on a continual basis. To reduce storage costs as reduced image quality becomes increasingly tolerable over time, as discussed above, even more processing has been required. That is, to increase compression of an image from data which has already been compressed, as discussed in the above-incorporated patent application Ser. No. 09/760,383, it is necessary to first decode the image from compressed data and then encode the image again using different quantization tables in order to further reduce the volume of data. This processing time represents a substantial cost which effectively increases the cost of storage over the cost of the reduced amount of storage medium occupied. Conversely, if the cost of processing for further data reduction can be reduced, the data may be stored for a longer period of time and/or in memory having shorter access or retrieval time at an economically acceptable cost.

SUMMARY OF THE INVENTION

It is therefore an object of the present invention to provide an image data processing method and apparatus capable of increasing the degree of compression of compressed data and reducing the volume of image data in reduced processing time.

In order to accomplish these and other objects of the invention, a method and apparatus is provided for transcoding compressed data for further compression including steps (or arrangements for performing steps) of entropy decoding compressed data to form quantized transform coefficient values, reducing a range of the quantized transform coefficient values to form quantized transform coefficient values of reduced range, altering at least one value in a quantization table to form an altered quantization table, entropy encoding said quantized transform coefficient values of reduced range to form further compressed data, and transmitting or storing the further compressed data with the altered quantization table.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
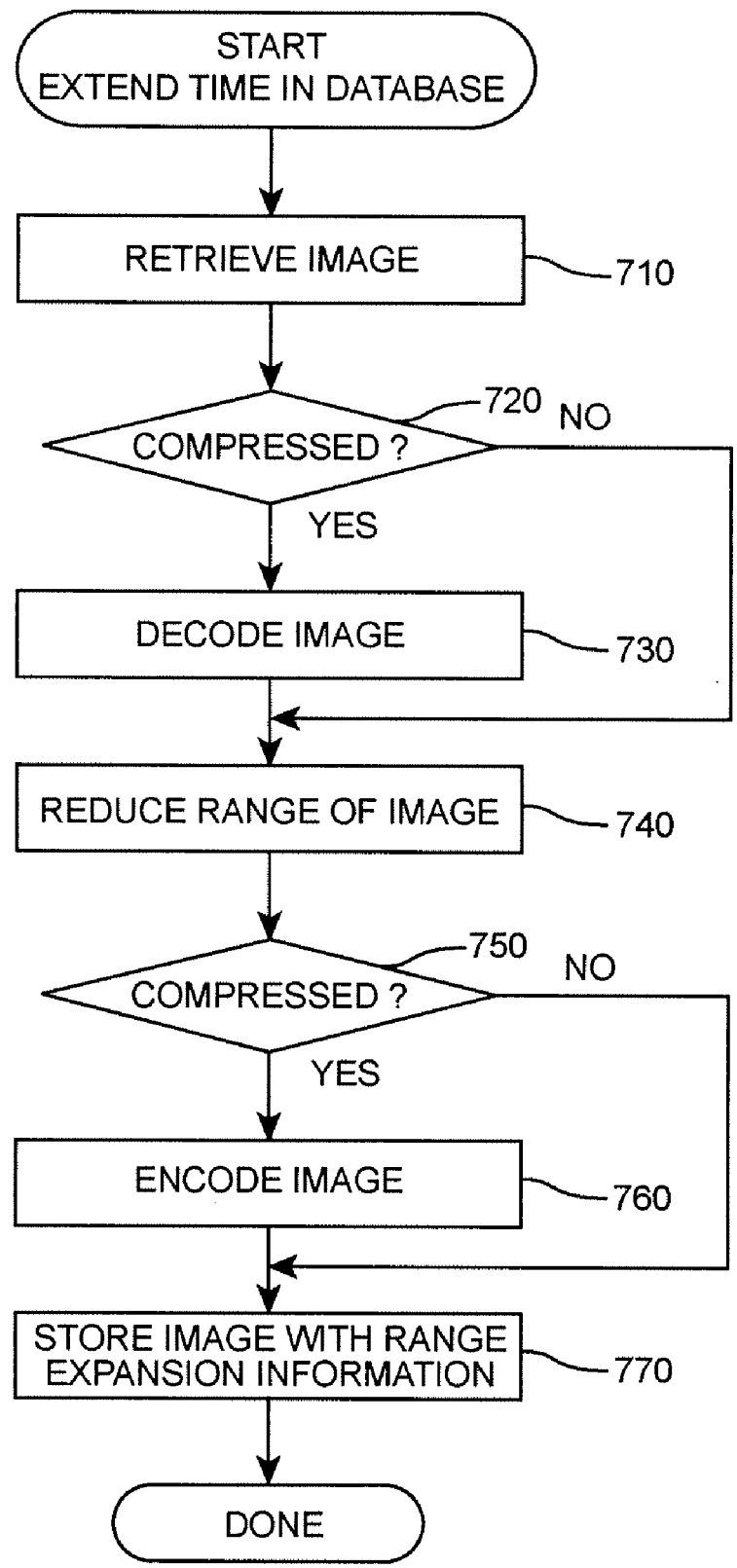
FIG. 1 is a flow chart or high-level block diagram illustrating an exemplary technique of increasing the degree of compression of compressed image data.
Figure 2:
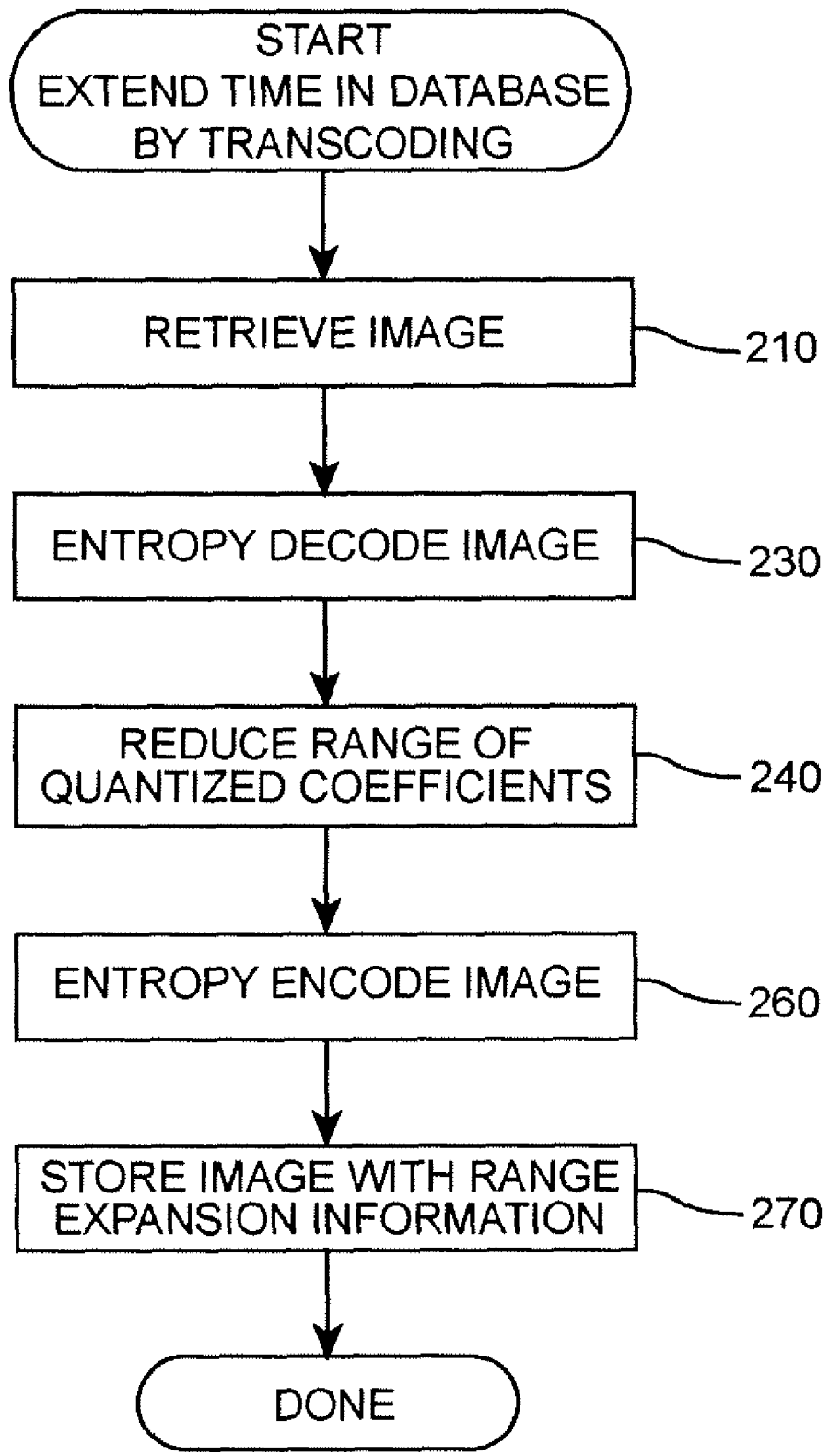
FIG. 2 is a flow chart or high-level block diagram illustrating processing of compressed image data to increase the degree of compression in reduced processing time in accordance with the invention.

Referring now to the drawings, and more particularly to FIG. 1, there is shown a flow chart or high-level block diagram illustrating an exemplary technique of increasing the degree of compression of compressed image data. This Figure is substantially the same as FIG. 7 of the above-incorporated U.S. patent application Ser. No. 09/760,383, which is principally directed to an apparatus and method for producing increased compression of document image data to a much reduced volume while maintaining legibility and document image quality and compatibility with standard decoding processes and without post-processing. This function is accomplished by reducing the dynamic range of the image data, encoding the data of reduced dynamic range using a first quantization table and storing or transmitting the encoded image data with a different quantization table which restores the dynamic range of the original image data during otherwise conventional decoding. In particular, this Figure depicts application of that technique to image data that has already been compressed by encoding in accordance with the JPEG standard. Accordingly, no portion of FIG. 1 is admitted to be prior art in regard to the present invention but is labelled "Related Art" since it is provided to facilitate an understanding of the present invention and its meritorious effects as illustrated in FIG. 2 and discussed below even though the distinguishing features of the present invention are not reflected therein.

More specifically, the image values present in images of documents allow a reduction in dynamic range of the image values which can be later restored while preserving detail and legibility. Such a reduction in dynamic range, while theoretically causing some loss of information and image fidelity, allows further compression of the image data beyond that currently employed for short term, high-speed access storage and a reduction of data volume by a factor usually in the range of two to five or more while maintaining the image quality at a level which is legible. Legibility of low contrast features may even be enhanced, as discussed in the above-incorporated application.

Such a reduction in data volume would reduce storage costs by a similar factor if the costs of processing are not considered. However, as alluded to above, it has been found desirable to store large numbers of documents such as personal checks. However, the cost of processing large numbers of documents already stored in compressed form in databases in order to reduce future storage costs or to provide higher speed accessibility would be quite substantial.

This cost can be more readily understood from consideration of FIG. 1 which depicts the process for further reducing data volume from digitally stored data for a single document. First, the image is retrieved 710 and, if compressed 720 with any compression technique including lossless coding rather than stored as raw image data, it is decompressed/decoded 730 by an appropriate decoder to restore the original image data. Optional histogram and pre-processing discussed in the above incorporated application are not illustrated in FIG. 1 but may be included if desired. In block 740, the range of the image is reduced, If, as determined at 750, the reduced range image data is to be compressed, (possibly with a different compression technique), it is encoded 760. Then the reduced range image (with or without compression) is stored with range expansion information 770. For the JPEG DCT-based compression, this range expansion information can be in the form of substituted, scaled Q table2. For other applications, it may be in the form of a JPEG-LS output remapping table.

As will be readily understood by those skilled in the art, the decode image process 730 includes entropy decoding, dequantizing and an inverse discrete cosine transform (IDCT) process. Entropy decoding is a process which can be carried out relatively rapidly. (Entropy coding exploits the fact that more common values justify fewer bits and less common values, representing relatively more information, justify use of relatively more bits.) On the other hand, dequantization and the IDCT processes are considerably more computationally intensive. The process for reducing the range of the image 740 can be carried out using a look-up table requiring two memory accesses and one storage operation for each image data sample. The process of encoding an image 760 requires a forward discrete cosine transform (DCT) operation, quantization and entropy encoding, which are computationally intensive.

It will also be readily understood and appreciated by those skilled in the art that the above process of FIG. 1 reconstructs the image data fully and sufficiently for display or other rendering (e.g. printing) while processes 740-770 are identical to processes which would be performed on raw image data in accordance with the above-incorporated application to accomplish an increased degree of compression beyond standard JPEG processing while maintaining detail and legibility of features of the document image. Therefore, the data could be described as being converted from the transform domain to the image domain (sometimes referred to as the real and/or pixel domain) and back to the transform domain. Thus, processes are involved which are substantially inverse processes of each other, either or both of which may be computationally intensive and require significant processing time when aggregated over a large plurality of documents.

The present invention provides the same result while the data remains in the transform domain and thus avoids performance of several pairs of substantially inverse and complementary processes while engendering some additional compression of data as will be described below. The process is well-described as transcoding since the data is not returned to its original form. The basic process of the invention will now be explained in accordance with the flow chart of FIG. 2 which can also be understood as a high-level block diagram of apparatus for carrying out the illustrated functions as in a programmed general purpose computer which will be configured by the program into arrangements for performing the illustrated functions or similarly configured special purpose logic processing circuits, as will be evident to those skilled in the art.

It is assumed for purposes of the following discussion that the image data will already be encoded in some compressed form such as code in compliance with the JPEG standard. It should be understood that the invention is completely applicable to any other compression encoding scheme and that the above assumption merely avoids the case where the original data is not in a compressed form (e.g. raw image data) for which suitable and preferred methodologies and apparatus are provided in the above-incorporated application.

As an overview of the process and apparatus in accordance with the invention, once the compressed image data is retrieved (210), the compressed data is entropy decoded 220 to restore the data to the form of quantized coefficients. The dynamic range of the quantized coefficients can then be directly reduced as illustrated at 240 and entropy encoding 260 performed, preferably with simplified processes which will be discussed in detail below. The further compression is then completed by storing (or otherwise transmitting) the resulting entropy encoded data with expansion information as illustrated at 270. The expansion information may be complementary to the range reduction or may be chosen to provide some image enhancement.

By avoidance of pairs of inverse, complementary operations, as alluded to above, the entropy decoding process 230 can generally be performed in less than one-quarter of the processing time required for the complete image decoding process 730 of FIG. 1. Similarly, the entropy encoding process can be generally completed in less than one-quarter of the time required for the complete image encoding process regardless of the compression technique or standard employed. In general, the process of reducing the range of the quantized coefficients can be performed much more rapidly than the reduction of the dynamic range of image data, particularly by preferred techniques which will be discussed below. Therefore, the gain in processing speed provided by the invention is at least a factor of four and often can be much greater, even allowing for the use of special-purpose processors for DCT and IDCT and quantization and dequantization processing.

The entropy decoding and encoding processes are well-understood and need not be discussed further except to observe that for entropy encoding, statistical analyses can often be omitted or replaced by relatively simple manipulations of the entropy coding of the original compressed data or alternatives to entropy encoding accommodated by the JPEG standard. The process of reducing range of the quantized coefficients 240 can be accomplished using a look-up table (LUT) which implies two memory accesses and a storage operation for each quantized coefficient processed or requiring reduction in range as does the corresponding operation 740 of FIG. 1 for each image sample. However, the number of samples in the image data of FIG. 1 is always sixty-four per macroblock while the number of quantized coefficients (including some zero-valued coefficients in accordance with coding conventions) for the same macroblock (preceding the end-of-block (EOB) marker/symbol) is often much less than sixty-four and often much less than sixteen. Further, since only the non-zero quantized coefficients can be reduced, the actual number of quantized coefficients is often even less. Moreover, some coefficients may be left unchanged when the rarity of non-zero coefficients at a zig-zag scan position (i.e. position in the transformed block) does not justify the extra computation and possible edge degradation, in which case, the quantization value corresponding to their position must also be left unchanged in the range restoration data. Therefore, the processing time to reduce the range of the quantized coefficients is, as a practical matter, often much less than one-quarter of the time required to reduce dynamic range of the image samples.

Further, if the range reduction is constant for all quantized coefficients which have their range reduced, only one LUT is required. Even more simple and expeditious arrangements often provide good results. For example, it is preferred in some cases to reduce the range by a factor of two which removes the need for any LUT and the range reduction can be achieved by a simple shift on the magnitude.

A special case of this simple range reduction embodiment is where the data is maintained or presented in a packed format as disclosed in the above-incorporated U.S. patent application Ser. No. 09/736,444, now U.S. Pat. No. 6,757,439, and/or Ser. No. 09/896,110 in which the range reduction by powers of two involves subtracting the number of powers of two from the size in the preceding RS byte. If the size value in the RS byte is less than the powers of two in the range reduction, the coefficient has been reduced to zero and the number of coefficients in the run must be extended to merge the new zero coefficient with the runs of zeros, if any, on either side of it. However, the total number of bytes in the reduced range data in the new packed format will remain the same or, more often, be reduced and it is impossible for a greater number of bits or bytes to be required in the JPEG packed format. Thus, while a slight amount of relatively simple additional processing may be required using a JPEG packed format, the same buffers may be overwritten with the reduced range data. The reduced range data is then entropy re-encoded to obtain the much increased compression. It should be noted in this regard that the buffer holds uncompressed quantized coefficients requiring at least two non-zero bytes per coefficient while the Huffman code may only require a few bits.

In general, for maximum data compression, the JPEG arithmetic coding option can be used to automatically provide entropy re-encoded data close to the entropy limit; thus improving compression while avoiding any image degradation and avoiding some processing time for collection of statistics for custom Huffman entropy encoding. The data can then be converted to baseline JPEG at a later time if desired.

Further in regard to the JPEG packed format, it was disclosed in the above-incorporated applications that certain processing is facilitated thereby. In particular, the JPEG packed format allows simplified generation of custom Huffman tables for the reduced range encoder. Custom Huffman tables can be saved with the arithmetically coded image for later transcoding back to baseline JPEG compression. These Define Huffman Table (DHT) markers could be stored separately from the JPEG image encoded data in a JPEG-abbreviated-for-table-specification data format so that those extra bytes are not transmitted if the arithmetic coded version is sufficient. (Note that the DHT marker will not be needed if a Huffman version will not be desired. The DHT marker is used if a transcoding to Huffman is needed because the decoder of the receiver does not know how to decode the more compressed arithmetic coding version.) Alternatively, the unused custom Huffman table(s) can be saved in a JPEG Application Marker (APPn marker) as detailed in the above incorporated Pennebaker et al. publication. The fields of such a marker can be registered to allow interpretation of the data. Such markers may be embedded with the image data or kept separately.

If care is taken in the range reduction process, an approximate custom Huffman table can be estimated from the tables prior to range reduction. For example, the shift in the probability distribution can be estimated from the amount of range reduction applied. If the Huffman table in the decoder is not the exemplary Huffman table given in the JPEG standard, it may be assumed to be a custom table, particularly if the RS symbol values are not in numeric order. If some distribution is assumed that corresponds to the number of symbols per code word lengths, then the new distribution can be computed given the amount of dynamic range reduction. If the code for a given R/S symbol is N bits, then the sum of all the relative fractions within the group add up to $\frac{1}{2}^N$. The relative frequency may be equally divided between all of the $2^N$ levels within the category. Alternatively, it can be adjusted so that smaller levels are more likely. As long as the total relative frequency matches the relative frequency of the original categories, the same Huffman code lengths would be assigned to the unchanged data. A dynamic range reduction then clusters the levels together. For levels that do not reduce to zero, these clusters can then be combined to collect the relative frequency of the categories. A conservative estimate would ignore the effect of the runs becoming longer. Note that the runs cannot become shorter since no new non-zero coefficients can be created. An estimate of the effect of the End-of Block (EOB) occurring earlier can be empirically determined by observing how typical images change their statistics for the desired range reduction. Care must be taken that all possible runs of zeros combined with sizes up to the maximum possible are allowed since the previous custom table may have had gaps for unused symbols and, unless the actual histogram is collected, such gaps are not allowed. As long as this condition is satisfied, this expedient allows immediate transcoding from one custom Huffman table to another custom Huffman table without having to collect the new histogram; assisting in preservation of the gain in processing time reduction which is otherwise achieved by the invention.

It was alluded to above that some of the quantized coefficients need not be changed or modification suppressed when the extra compression does not justify the computation and possible edge degradation. The decision about whether quantized transformation coefficients in particular zig-zag scan order positions should or should not be modified could be made on the basis of an optional histogram of the number of non-zero transform coefficients at each zig-zag scan position or, for example, estimated from a custom Huffman table in the original data. The largest gain in compression will be achieved for those zig-zag scan positions with frequently occurring non-zero quantized transform coefficients. For positions in which non-zero quantized transform coefficients occur rarely, the gain in compression will not justify the computation time or the degradation in image quality, even if very slight. Thus the statistics of the number of non-zero quantized transform coefficients, however derived or estimated, can provide an estimation of the compression gain and storage savings and thus assist in identifying zig-zag scan positions in which quantized coefficients should not be changed.

For example, on the reverse side of checks, endorsements will not always be of high contrast while the safety pattern is likely to have very different statistics in much higher/larger numbers. If the rationale of not modifying quantized transform coefficients at zig-zag scan positions with relatively infrequently occurring non-zero quantized coefficients is applied in such a case, it is likely that image values of the endorsement will not be modified as much and may result in preserving the legibility and detail of the endorsements. One significant advantage to doing the range reduction in the transform domain rather than the real or pixel domain is this ability to treat transform coefficients at different positions in the zig-zag scan order in a different manner and thus preserve image feature which may be of increased significance (as may be indicated by relative frequency of occurrence) while achieving extreme data compression.

If a custom Huffman table has been used (or is included in case transcoding of the arithmetic coding to baseline Huffman tables were to be needed) the number of bits assigned to the End-of-Block (EOB) code can be included in the function used to estimate the zig-zag scan position at which to stop modifying the coefficients. In the AC coefficient Huffman code tables listed in annex K of the JPEG technical specification (included in the text incorporated by reference above) the EOB has a four bit code length in the luminance table as compared to a two bit code length in the chrominance table. Combined with the lengths of the other run/size combinations, an estimate of when in the zig-zag scan order to stop modifying the coefficients can be obtained, as well as an estimate of the bit savings from the modifications. The longer code length for the EOB in the luminance AC coefficient table indicates that quantized transform coefficients should be modified at more zig-zag scan positions.

In this regard, care must also be taken to avoid allowing changed quantization table values from exceeding 255 for eight-bit precision in the original samples (or other maximum based on the original precision of the data). (A zero value is not allowed and thus the allowed range is 1 to 255.) If the quantization values of the decoder are already at 255 before alteration to compensate for range reduction, those quantized coefficients can be set to zero if less than the range reduction but not reduced since the quantization values are already at their maximum value and the additional range restoration is not feasible when the quantization values are restricted to eight bits (e.g. for baseline entropy coding).

In view of the foregoing, it is seen that the invention provides a substantial reduction in processing time for increasing compression of document image data by performing the additional compression during transcoding the encoded signal by doing range reduction in the transform domain after just entropy decoding that avoids the computationally intensive dequantization, inverse transform to the real/image domain, range reduction in the real/image domain followed by a forward transform to return to the transform domain and a re-quantization before being able to do the entropy re-encoding. Therefore, processing time for further compression in accordance with the invention is likely to be not more than one-quarter of the processing time required when compression is performed in the real or image pixel data domain.

When the quantized coefficients are scaled down, the statistics for the Huffman table are changed. A revised Huffman table can be estimated by using the old table to estimate the relative frequencies of the symbols and then scaling the symbols appropriately. For example, scaling down the quantized coefficients by a factor of two will merge adjacent coefficient frequencies. On the average, each Huffman code will need one less bit less for this case because two frequencies will have been combined.

This reduction in processing time and expense corresponds to a direct and substantial reduction of the cost of storage of images in order to economically provide high speed and "on line" access to such images for an extended period of time and allows such benefits to be provided more readily and efficiently to existing databases of such data in compressed form.

While the invention has been described in terms of a single preferred embodiment, those skilled in the art will recognize that the invention can be practiced with modification within the spirit and scope of the appended claims. In particular, the invention can be readily applied to compressed data which has been compressed by any compression technique and other lossy, transform-based compression algorithms as well as techniques conforming to the JPEG standard.

The invention claimed is:

1. A method for transcoding compressed data for further compression while said compressed data remains in the transform domain including steps of
    entropy decoding said compressed data to form a plurality of quantized transform coefficient values,
    reducing, using a computer, dynamic range of said plurality of quantized transform coefficient values to form quantized transform coefficient values of reduced dynamic range, wherein values of some or all quantized transform coefficients at different zig-zag scan order positions are reduced in dynamic range in different manners other than or in addition to scaling,
    altering at least one value in a first quantization table to form an altered quantization table having values based on said dynamic range reduction of quantized coefficient values of reduced dynamic range in said different manners at respective zig-zag scan order positions,
    entropy encoding said quantized transform coefficient values of reduced dynamic range using statistics derived from entropy coding of said compressed data to form further compressed data, and
    transmitting or storing said further compressed data with said altered quantization table.

2. The method as recited in claim 1, wherein said step of reducing a dynamic range reduces said dynamic range by a factor of two.

3. The method as recited in claim 2, wherein altered quantization values are in the range of 1 to 255 for eight bit precision in original data samples.

4. The method as recited in claim 2, including the further step of
    altering a Huffman table based on the alteration of the quantized coefficients without collecting new statistics for an image.

5. The method as recited in claim 4, wherein frequency of occurrence is estimated from original Huffman table data.

6. The method as recited in claim 4, wherein frequency of occurrence is determined from a histogram of said quantized transform coefficient values.

7. The method of claim 2, wherein said entropy encoding step includes arithmetic coding.

8. The method of claim 2, wherein said transform coefficient values are in packed format.

9. The method as recited in claim 1, wherein altered quantization values are in the range of 1 to 255 for eight bit precision in original data samples.

10. The method as recited in claim 1, including the further step of
    altering a Huffman table based on the alteration of the quantized coefficients without collecting new statistics for an image.

11. The method as recited in claim 10, wherein frequency of occurrence is estimated from original Huffman table data.

12. The method as recited in claim 10, wherein frequency of occurrence is determined from a histogram of said quantized transform coefficient values.

13. The method of claim 1, wherein said entropy encoding step includes arithmetic coding.

14. The method of claim 1, wherein said quantized transform coefficient values are in packed format.

15. The method as recited in claim 1, wherein said step of altering said at least one value in said quantization table is complementary to said step of reducing a dynamic range for said at least one value.

16. Apparatus for transcoding compressed data for further compression while said compressed data remains in the transform domain comprising
- means for entropy decoding said compressed data to form a plurality of quantized transform coefficient values,
- means for reducing dynamic range of said plurality of quantized transform coefficient values to form quantized transform coefficient values of reduced dynamic range, wherein, values of some or all quantized transform coefficients at different zig-zag scan order positions are reduced in dynamic range in different manners other than or in addition to scaling,
- means for altering at least one value in a first quantization table to form an altered quantization table having values based on said dynamic range reduction of quantized coefficient values of reduced dynamic range in said different manners at respective zig-zag scan order positions,
- means for entropy encoding said quantized transform coefficient values of reduced dynamic range using statistics derived from entropy coding of said compressed data to form further compressed data, and
- means for transmitting or storing said further compressed data with said altered quantization table.

\* \* \* \* \*